United States Patent [19]

Lange

[11] Patent Number: 4,998,320
[45] Date of Patent: Mar. 12, 1991

[54] APPARATUS FOR MOVABLY SUPPORTING BEDS AND THE LIKE

[75] Inventor: Hans-Willi Lange, Wermelskirchen, Fed. Rep. of Germany

[73] Assignee: Albert Schulte Söhne GmbH. & Co., Wermelskirchen, Fed. Rep. of Germany

[21] Appl. No.: 431,441

[22] Filed: Nov. 1, 1989

[30] Foreign Application Priority Data

Nov. 3, 1988 [DE] Fed. Rep. of Germany ....... 3837307

[51] Int. Cl.$^5$ ............................................. B60B 33/00
[52] U.S. Cl. ..................................... 16/35 R; 188/112
[58] Field of Search ....................... 16/35 R; 188/1.12

[56] References Cited

U.S. PATENT DOCUMENTS

| | | | |
|---|---|---|---|
| 3,409,105 | 11/1968 | Clinton | 16/35 R |
| 4,653,139 | 3/1987 | Vollberg | 16/20 |
| 4,658,466 | 4/1987 | Vollberg | 16/35 |
| 4,720,893 | 1/1988 | Mellwig | 16/35 |
| 4,765,021 | 8/1988 | Mellwig | 16/20 |

FOREIGN PATENT DOCUMENTS 1505786 12/1973 Fed. Rep. of Germany.
2344208 3/1975 Fed. Rep. of Germany ..... 16/35 R
327989 7/1935 Italy ................................. 16/35 R

*Primary Examiner*—Richard K. Seidel
*Assistant Examiner*—Carmine Cuda
*Attorney, Agent, or Firm*—Peter K. Kontler

[57] ABSTRACT

The legs of a hospital bed are mounted on discrete casters with brakes for the wheels and blocking devices for the wheel frames. The wheel frames can be unblocked to swivel in their carriers which are mounted in or on the respective legs, and contain cylinders for vertically movable plungers serving to engage or disengage the respective brakes as well as to activate or deactivate the blocking devices. At least two plungers are movable to three different positions in one of which the respective wheels are free to rotate and the respective frames are free to swivel, in another of which the wheels are braked and the frames are blocked, and in the third of which the wheels are free to rotate but the frames are blocked. This is achieved by the provision of a control system employing discrete cylinder and piston units for the casters and conduits which can supply metered quantities of hydraulic fluid from the cylinders of the respective units to the cylinders in the corresponding carriers or vice versa. The pistons of all cylinder and piston units are biased against a common indexible cam.

21 Claims, 2 Drawing Sheets

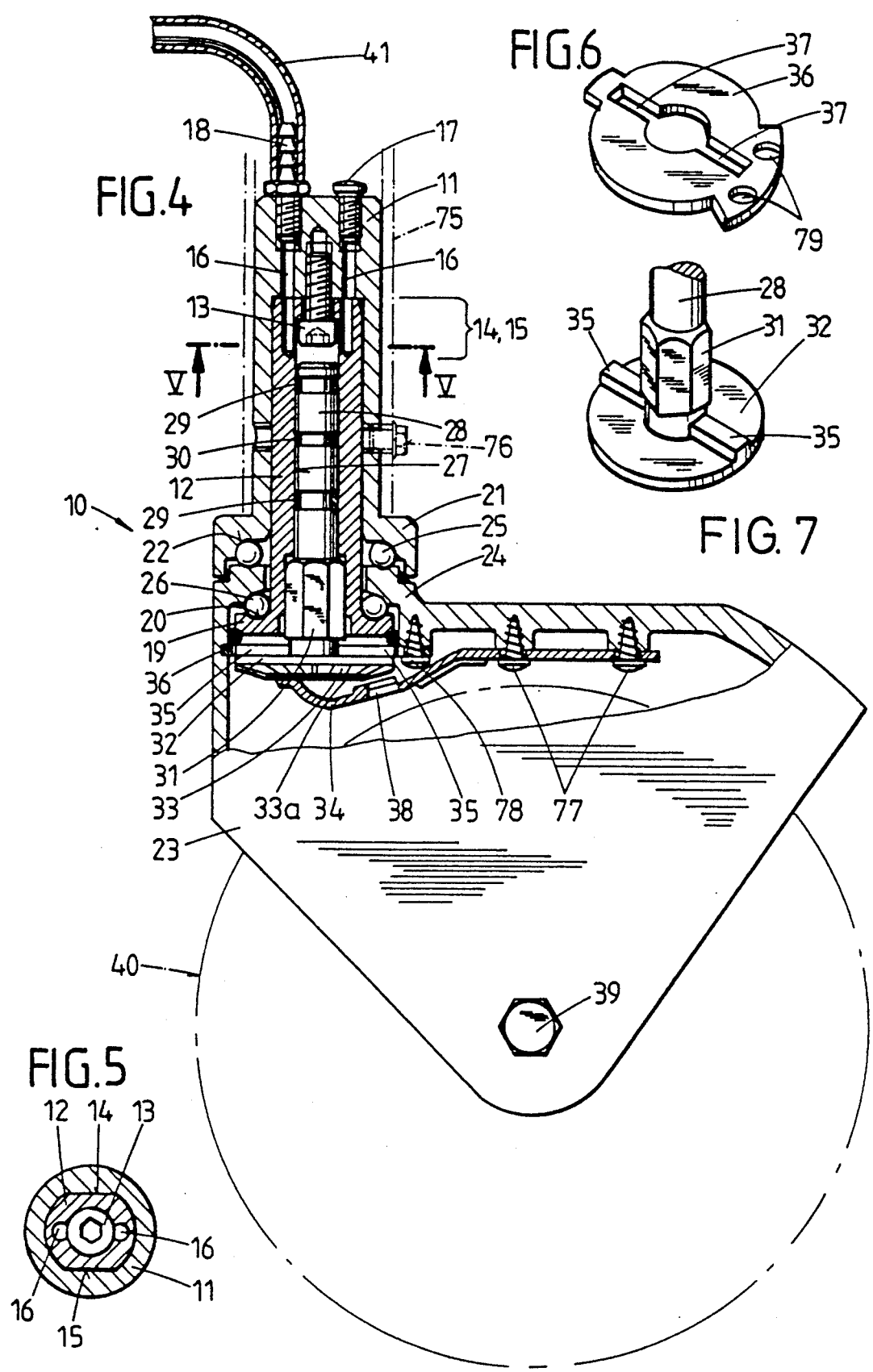

APPARATUS FOR MOVABLY SUPPORTING BEDS AND THE LIKE

BACKGROUND OF THE INVENTION

The invention relates to improvements in apparatus for movably supporting various types of commodities, such as beds (especially hospital beds) and the like. More particularly the invention relates to improvements in apparatus wherein the commodity which is to be moved or shifted is mounted on one or more casters and the casters are provided with brakes for their wheels as well as with blocking devices for their wheel frames. Still more particularly, the invention relates to improvements in apparatus which, in addition to one or more casters, comprise means for controlling the movements of the caster wheel or wheels with reference to the respective frame or frames (by controlling the application or disengagement of the brake or brakes), and for controlling rotation (swivelling) of the wheel frame or frames with reference to the carrier or carriers for the wheel frame or frames (by controlling the operation of the blocking device or devices).

German Auslegeschrift No. 1 505 786 of Haussels discloses an apparatus wherein the carrier for the wheel frame of each of several casters defines a cylinder chamber for a piston which is biased in one direction by a coil spring and is movable in the opposite direction in response to admission of compressed air. The piston rod of each piston is connected with a first lever which can block rotation of the wheel frame relative to its carrier. The first lever is articulately connected with a second lever which is mounted in the interior of the respective wheel frame and acts as a brake for the adjacent wheel. The wheel is braked, and the wheel frame is held against rotation relative to its carrier, when the spring in the carrier is free to maintain the piston and its piston rod in one end position. When the operator of the bed or another caster-mounted commodity wishes to disengage the brakes and to free the wheel frames for rotation relative to their carriers, the operator causes a control system to admit compressed air into the cylinders of the carriers so that the springs are caused to store energy and the pairs of levers are pivoted in directions to free to wheel frames as well as to disengage the brakes. In other words, the commodity can be rolled along the ground in any desired direction as long as the cylinders of all carriers are connected with the source of compressed air.

As a rule, a hospital bed is mounted on four casters, one for each leg of the bed, and the means for admitting compressed air to the carriers of the four casters is connected with the four carriers by discrete conduits for compressed air. The source of compressed air is a pump.

A drawback of the apparatus which is disclosed by Haussels is that the wheel frames of all four casters are free to swivel relative to the respective carriers when the wheels of all four casters are free to rotate relative to the respective frames, or that the wheels of all four casters are braked when the wheel frames of all four casters are blocked (i.e., when the frames cannot swivel with reference to the respective legs of the bed). In other words, it is not possible to block the wheel frames while the wheels are free to rotate or vice versa. This is due to the fact that the gaseous fluid which is used in the control system of Haussels cannot be admitted into or evacuated from the cylinders in the carriers of the casters in accurately metered quantities, i.e., compressed air is permitted to escape so that the springs can take over in order to maintain the blocking and braking means in operative positions, or compressed air is admitted at a pressure which suffices to move the pistons and their piston rods to positions in which the first levers cannot prevent swiveling of the wheel frames and the second levers cannot brake the respective wheels.

On the other hand, it is often desirable and advantageous to operate the casters in such a way that the wheel frames are blocked in a predetermined orientation while the wheels are free to rotate with reference to their frames.

OBJECTS OF THE INVENTION

An object of the invention is to provide an apparatus of the above outlined character which is constructed and assembled in such a way that the wheel of each of its casters can rotate while the respective wheel frame is held against rotation with reference to its carrier.

Another object of the invention is to provide novel and improved casters for use in the above outlined apparatus.

A further object of the invention is to provide the apparatus with novel and improved means for controlling the caster or casters in such a way that the versatility of each caster is more pronounced than that of casters in heretofore known apparatus.

An additional object of the invention is to provide an apparatus which is simpler but more versatile than heretofore known apparatus for movably mounting and for controlling the movements of hospital beds and like commodities.

Still another object of the invention is to provide the apparatus with novel and improved means for supplying fluid to the cylinders in the carriers of wheel frames of casters which support the legs of a hospital bed or another commodity.

A further object of the invention is to provide an apparatus which renders it possible to disengage the brakes for the wheels of two or more casters while the wheel frames of the casters are blocked against swivelling with reference to their carriers.

An additional object of the invention is to provide the apparatus with novel and improved means for synchronizing the movements of brakes and blocking devices for two or more casters.

Another object of the invention is to provide the apparatus with novel and improved means for operating one or more first casters in accordance with a first predetermined pattern and to operate one or more additional casters in accordance with a different program.

A further object of the invention is to provide novel and improved wheel frames and novel and improved wheel frame carriers for use in the casters of the above outlined apparatus.

SUMMARY OF THE INVENTION

The invention resides in the provision of an apparatus for supporting movable commodities, for example, hospital beds. The improved apparatus comprises ground contacting means including one or more casters each having a wheel, a frame mounting the wheel for rotation about a first axis (normally about a horizontal axis if the respective caster is mounted at the lower end of the leg of a bed), and a carrier which mounts the frame for rotation about a second axis extending substantially at right angles to the first axis (the second axis is or can be vertical if the carrier is installed in or at the lower end of a leg forming part of a hospital bed). The apparatus further comprises means for controlling the movements of the frame and wheel of each caster about the respective axis. The controlling means comprises a fluid-operated plunger mounted in each carrier for movement between a plurality of positions, a brake provided on or in each frame to engage the respective wheel in response to movement of the associated plunger to a first position, a blocking device for each caster and operative to prevent rotation of the respective frame in response to movement of the associated plunger to at least one second position, and means for moving the plungers between their positions including a motor for each caster. Each motor has means for supplying metered quantities of fluid to the respective carrier.

Each carrier includes a cylinder which reciprocably receives the respective plunger, and each motor preferably includes a cylinder and piston unit, means for displacing the pistons with reference to the cylinders of the respective units, and means for conveying fluid (preferably oil or another hydraulic fluid) between the cylinders of the carriers and the cylinders of the respective units in response to displacement of the corresponding pistons.

If the ground contacting means comprises two or more casters, the controlling means preferably comprises discrete cylinder and piston units, discrete conveying means, discrete brakes and discrete blocking devices for the casters. However, the displacing means preferably comprises a single indexible displacing member for the pistons of all cylinder and piston units. Such units include at least one first and at least one second cylinder and piston unit, and the displacing member is preferably installed between the first and second units. The apparatus preferably further comprises a common housing for the first and second cylinder and piston units The housing defines a space for the indexible displacing member, and the pistons of the first and second cylinder and piston units extend into such space. The first and second cylinder and piston units further include means (e.g., coil springs) for yieldably biasing the pistons of the first and second units against the displacing member.

If the ground contacting means comprises at least four casters, the third and fourth cylinder and piston units are or can be arranged in such a way that the displacing member is located between them. Such apparatus can further include a second housing for the third and fourth cylinder and piston units. The housings can be provided with cooperating male and female coupling elements which serve to maintain the housings in predetermined positions with reference to each other, for example, one of the housings can be stacked with and can be located on top of the other housing.

The distancing member can include abutments for the cylinders of the cylinder and piston units and/or for the housing or housings for one or more pairs of units.

The distancing member can include or constitute a cam which is indexible about a predetermined axis, and means for indexing the cam. The latter can be provided with a centrally located recess having a non-circular outline, and the indexing means can include a handle (e.g., a one-armed lever) having a portion which is non-rotatably received in the recess of the cam.

The pistons of the cylinder and piston units track the peripheral surface of the cam, and such peripheral surface can include three portions which are disposed at different distances from the predetermined axis and serve to move the piston of at least one cylinder and piston unit to three different positions relative to the respective cylinder in response to indexing of the cam to corresponding angular positions. The piston which is displaced by the cam causes or permits the flow of a predetermined (metered) quantity of fluid between its cylinder and the respective carrier.

Detent means can be provided to releasably hold the cam in any one of three or more different positions. The detent means can include a first portion on the indexing means and a complementary second portion on at least one of the cylinder and piston units and/or on the aforementioned housing or housings.

The peripheral surface of the cam can be provided with two additional portions which are disposed at different distances from the predetermined axis. The arrangement may be such that the aforementioned three portions form part of one half, and the two additional portions form part of the other half of the peripheral surface of the distancing member. This enables the distancing member to move one piston of the first and second units between three different positions and the other piston of the first and second units between two different positions, or to move the pistons of the first and third units between three different positions and to move the pistons of the second and fourth units between two different positions.

The carrier can include a casing (e.g., an elongated cup-shaped casing) and a cylinder which is non-rotatably installed in the respective casing. To this end, the cylinder of each carrier includes a portion having a non-circular outline and receiving a portion of the respective plunger in such a way that the latter can reciprocate relative to but cannot turn in the cylinder of its carrier. The cylinders of the carriers are non-rotatably installed in the respective casings, and each such cylinder preferably further comprises a radially outwardly extending flange having a first annular track. The casing of each carrier then comprises a second track which is spaced apart from the respective first track, and the corresponding frame has a preferably annular portion which is disposed between the first and second tracks. Spherical or otherwise configurated antifriction rolling elements can be installed between the annular portion of each frame and each of the respective first and second tracks to ensure that the frame can be rotated about its (second) axis with a minimum of effort when the respective blocking means permit such rotation of the frame.

Each plunger can include a toothed gear (particularly a bevel gear) which is located within the respective frame. The brakes are preferably in permanent engagement with and are movable by the gears of the respective plungers (which cannot rotate with reference to their carriers) against the adjacent wheels in response to movement of the respective plungers to their first positions.

Each brake can include a leaf spring having a first portion secured to the respective frame and a second portion abutting the gear of the corresponding plunger. The second portion of each leaf spring preferably includes at least one tooth which is engageable with the teeth of the corresponding gear in a further position of the plunger. This ensures that the frame cannot rotate about its (second) axis while the wheel is free to rotate in its frame. Each gear can include a toothless central portion and the free end portion of the respective leaf spring abuts the toothless portion of the adjacent gear.

Each blocking device can include a first blocking portion on the plunger and a second blocking portion on the respective frame. The second blocking portion is engaged by the first blocking portion in a second position of the respective plunger. One portion of each blocking device can include at least one projection (e.g., one or more teeth or ribs), and the other portion of each blocking device then comprises at least one recess (e.g., in the form of one or more slots) which receives the respective projection or projections in a second position of the respective plunger.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 4 is an enlarged partly elevational, partly schematic and partly vertical sectional view of a caster which can be used in the apparatus of FIG. 1;

FIG. 5 is a horizontal sectional view of the carrier for the wheel frame substantially as seen in the direction of arrows from the line V—V of FIG. 4;

FIG. 6 is a perspective view of one portion of the blocking device for a wheel frame; and FIG. 7 is a fragmentary perspective view of a plunger with the other portion of the blocking device for the wheel frame.

DESCRIPTION OF PREFERRED EMBODIMENTS

Figure 1:
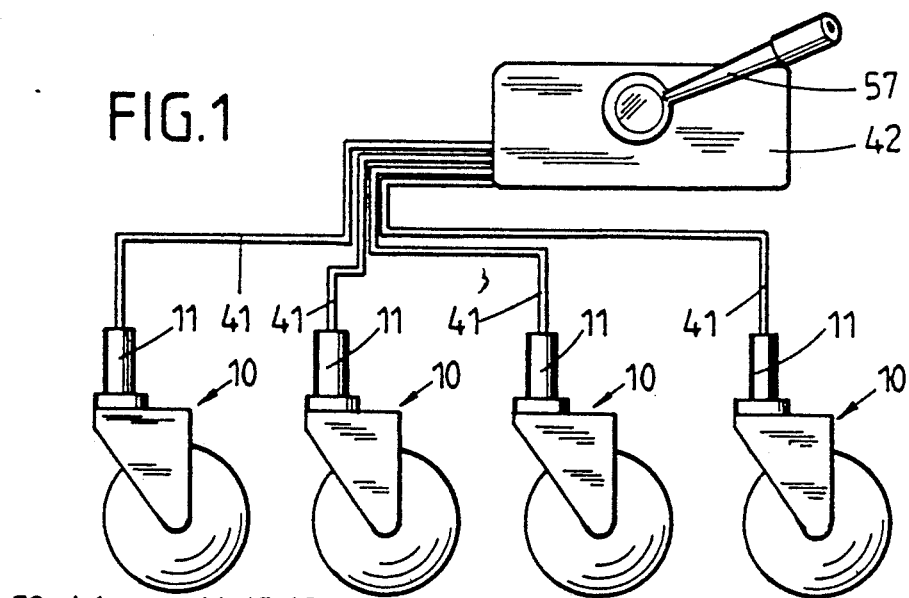
FIG. 1 is a schematic partly elevational and partly plan view of an apparatus with four casters which embodies one form of the invention.

FIG. 1 shows an apparatus wherein the ground contacting means includes four casters 10 each having an upright tubular carrier 11 which can be installed in the lower end portion of a leg 75 (FIG. 4) forming part of a commodity, such as a bed, particularly a hospital bed. The lower end portion of each leg 75 can be provided with a recess or socket for the respective carrier 11, and each carrier can be releasably held in the respective leg by one or more radially extending screws 76 or the like. The shank of each screw extends through the leg and into a recess or hole (not shown) in the respective carrier 11. Reference may also be had to commonly owned U.S. Pat. Nos. 4,653,139 and 4,720,893 which disclose various types of casters for use on or for the legs of hospital beds or other commodities.

As can be seen in FIG. 4, each carrier 11 comprises an outer shell or casing which is directly received in a leg 75 or the like, and a cylinder 12 which is telescoped into the casing and has a lower end portion provided with a radially outwardly extending flange 19 disposed beneath and spaced apart from an annular flange 21 at the open lower end of the casing. The wall at the upper end of the cylinder 12 is traversed by a threaded fastener 13 in the form of a screw which separably secures the cylinder to the adjacent end wall of the casing of the carrier 11. As can be seen in FIG. 5, the upper portion of the cylinder 12 has two parallel external flats 14 which are adjacent internal flats 15 of the casing of the carrier 11 so that the cylinder 12 and the casing are held against rotation relative to each other. The illustrated relatively simple and inexpensive connection (by means of a single threaded fastener 13) between the cylinder 12 and the casing of the respective carrier 11 contributes significantly to simplicity of, and convenience of assembling and dismantling, the entire caster 10.

The end wall at the upper end of the casing of the carrier 11 which is shown in FIG. 4 is provided with two axially parallel bores or holes 16 for admission or evacuation of a fluid. The lower ends of the holes 16 communicate with registering ports in the top wall of the cylinder 12. The upper end of the right-hand hole 16 contains a threaded venting member 17 which can be loosened to permit escape of air from the chamber 27 of the cylinder 12. The left-hand hole 16 contains a portion of a nipple 18 which is separably connected with one end portion of a conduit 41 (e.g., a flexible hose) which serves as a means for conveying a pressurized hydraulic fluid between the chamber 27 of the cylinder 12 and a motor 43 in the form of a cylinder and piston unit (see FIGS. 2 and 3).

The upper side of the flange 19 at the lower end of the cylinder 12 is provided with an annular track 20 adjacent an annular portion 24 forming part of the top wall or web of bifurcated frame 23 forming part of the caster 10 and carrying a horizontal shaft 39 for a wheel 40 (indicated in FIG. 4 by phantom lines). The flange 19 is spaced apart from the flange 21 at the lower end of the casing of the carrier 11, and the underside of the flange 21 is provided with a second annular track 22 at a level above the annular portion 24 of the wheel frame 23. A first set of spherical antifriction rolling elements 25 is installed between the track 22 of the flange 21 and a track at the upper side of the annular portion 24, and a second set of spherical antifriction rolling elements 26 is confined between the track 20 and a similar track at the underside of the annular portion 24. The flanges 19, 21 cooperate with the annular portion 24 to define for the frame 23 an axis of rotation which is normal to the axis of the shaft 39 for the wheel 40. When the caster 10 of FIG. 4 is properly installed in the corresponding leg 75 of a bed or the like and the wheel 40 engages a horizontal ground (e.g., the floor in a hospital room), the axis of the shaft 39 is horizontal and the axis of rotation of the frame 23 with reference to the carrier 11 is substantially vertical. As mentioned above, the casing of the carrier 11 is non-rotatably installed in the leg 75 by means of one or more screws 76 or the like, and the cylinder 12 is non-rotatably installed (at 14, 15) in the casing of the carrier 11. Thus, when the frame 23 is not blocked, it is free to swivel about the vertical axis of the carrier 11 and its cylinder 12.

The lower end of the cylinder chamber 27 is enlarged and is bounded by a non-circular (preferably polygonal) internal surface of the cylinder. This enlarged lower end of the cylinder chamber 27 receives a complementary portion or boss 31 (see also FIG. 7) of an elongated piston or plunger 28 (hereinafter plunger) which is non-rotatably but axially movably installed in and projects beyond the flange 19 at the open lower end of the cylinder 12. The illustrated boss 31 has a hexagonal cross-sectional outline. The peripheral surface of the plunger 28 above the boss 31 is formed with circumferentially extending grooves for guide rings 29 and one or more sealing rings 30. The purpose of the sealing ring or rings 30 is to prevent escape of pressurized hydraulic fluid (such as oil) from the cylinder chamber 27. The pressurized fluid in the chamber 27 above the plunger 28 not only effects axial movements of the plunger 28 with reference to the cylinder 12 but also serves to lubricate the neighboring surfaces of the cylinder 12 and plunger 28.

The lower end portion 32 of the plunger 28 (beneath the boss 31) is enlarged and constitutes a bevel gear with an annulus of gear teeth 33 adjacent its peripheral surface. The central portion 33a of the underside of the gear 32 (within the annulus of teeth 33) is smooth and is engaged by the free end portion of an elongated leaf spring 34 constituting a brake for the wheel 40. A portion of the brake 34 which is adjacent its free end is provided with one or more upwardly extending teeth 38 which can mate with the adjacent teeth 33 of the bevel gear 32 in a selected (lowermost) axial position of the plunger 28. The other end portion of the brake 34 is separably secured to the web of the wheel frame 23 by threaded fasteners 77.

The device which serves to block rotation of the frame 23 with reference to the carrier 11 of the caster 10 includes the gear 32 and the tooth or teeth 38, and this blocking device further comprises a first portion (FIGS. 4 and 7) including two radially extending projections 35 (FIG. 7) in the form of ribs or strips at the upper side of the bevel gear 32, and a disc-shaped second portion 36 (FIGS. 4 and 6) which is non-rotatably secured to the frame 23 by threaded fastener means 78. The disc-shaped portion 36 of the blocking device for the frame 23 has two holes 79 for fastener means 78, and two aligned recesses or slots 37 which can receive the projections 35 of the first portion of the blocking device in the upper end position of the plunger 28 to thereby non-rotatably couple the frame 23 to the carrier 11.

FIG. 4 shows the plunger 28 in the upper end position in which the tooth or teeth 38 of the brake (leaf spring) 34 are disengaged from the adjacent teeth 33 of the gear 32 but the projections 37 of the plunger 28 are located in the recesses or grooves 37 of the discshaped blocking portion 36, i.e., the frame 23 is held against rotation about a vertical axis with reference to the carrier 11. At the same time, the underside of the brake 34 is disengaged from the peripheral surface of the wheel 40 so that the latter is free to rotate about the axis of its shaft 39. If the plunger 28 is moved downwardly to an intermediate position, the teeth 33 of the gear 32 are still out of mesh with the adjacent tooth or teeth 38 of the brake 34 and the latter is still spaced apart from the wheel 40 so that the wheel 40 is free to rotate about the axis of the shaft 39 and the blocking device 32-33, 35-38 is idle, i.e., the orientation of the frame with reference to the carrier 11 can be changed. When the plunger 28 is caused to descend to its lower end position, the teeth 33 move into mesh with the adjacent tooth or teeth 38 (to block the frame 23) and the brake 34 engages the peripheral surface of and prevents rotation of the wheel 40 about the axis of its shaft 39.

The construction of the other three casters 10 is or can be identical with that of the caster 10 which is shown in FIGS. 4 and 5.

Figure 2:
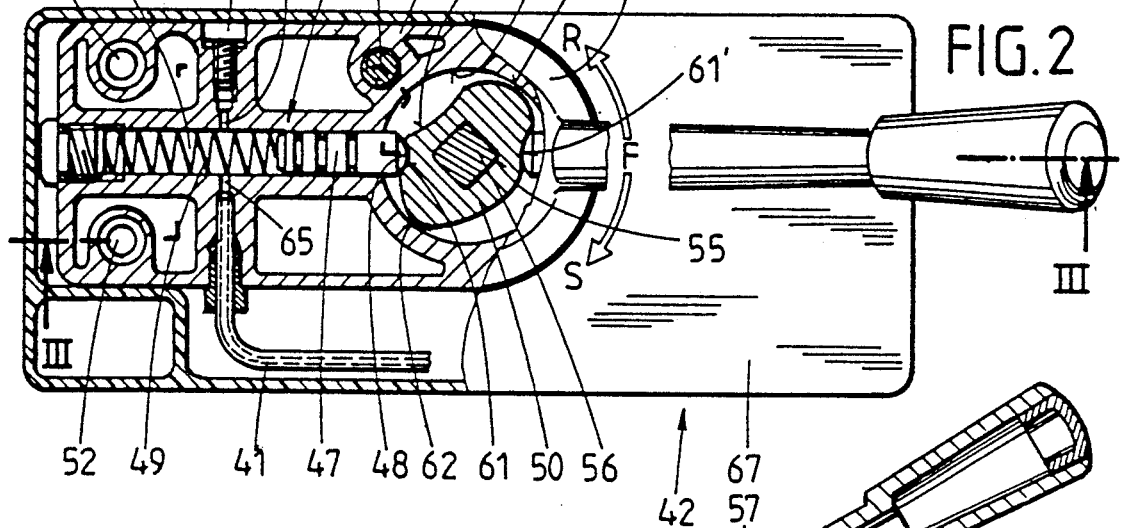
FIG. 2 is an enlarged partially plan and partially horizontal sectional view of the controlling means in the apparatus of FIG. 1.
Figure 3:
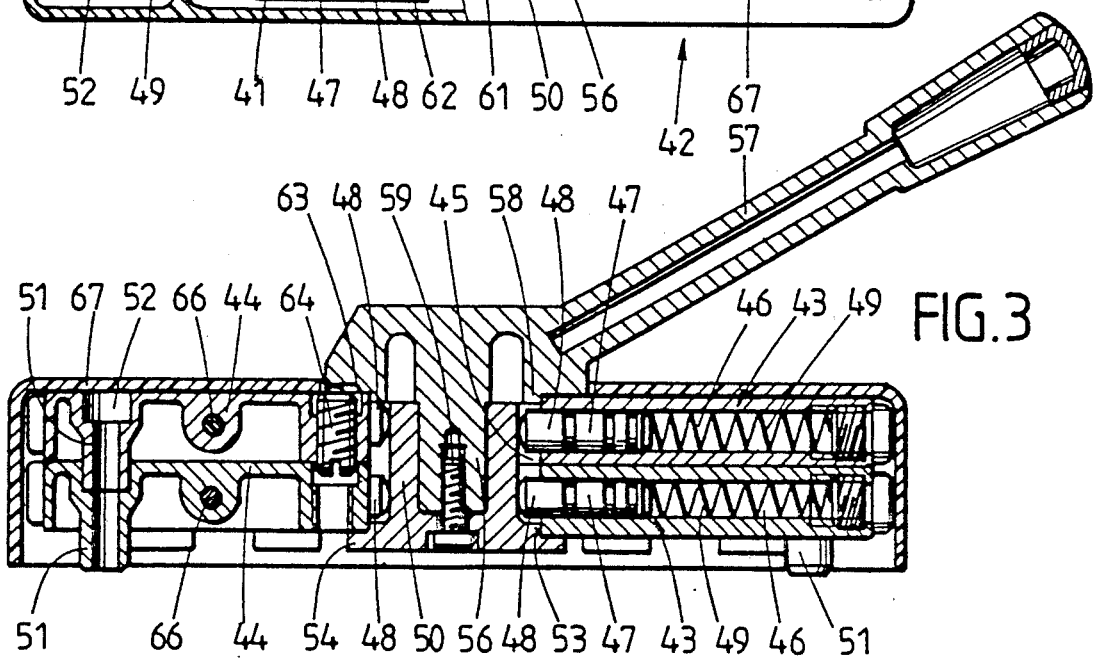
FIG. 3 is a vertical sectional view substantially as seen in the direction of arrows from the line III—III of FIG. 2.

The means for controlling the movements of the frames 23 of all four casters 10 about the axes of the respective carriers 11 and for controlling rotation of the wheels 40 about the axes of the respective shafts 39 is shown in FIGS. 1, 2 and 3. Such controlling means includes the cylinders 12 and plungers 28 of the casters 10 and further includes a discrete cylinder and piston unit 43 for each caster 10. The units 43 are confined in the outer housing 67 of a regulator 42 which is or can be mounted on the bed frame adjacent one side of the mattress (not shown) to be within reach of the hand of the occupant of the bed as well as within reach of an attendant in charge of the patient. The controlling means further includes the aforementioned conduits 41 (e.g., hoses) which convey hydraulic fluid between the cylinders 12 of carriers 11 of the casters 10 and the cylinders 46 of the respective cylinder and piston units 43.

A first pair of units 43 is confined in a first common housing 44 within the outer housing 67 of the regulator 42, and a second pair of units 43 is confined in a second common housing 44 which is disposed on top of and is aligned with the first housing 44. To this end, the housings 44 are provided with aligned coupling elements 52 each of which has a smaller-diameter portion 51 receivable in the larger-diameter portion of an adjacent coupling element 52.

The coupled-together housings 44 have aligned centrally located spaces 45 for a single displacing member 50 in the form of a cam which is indexible about the axis of a threaded fastener 59 serving to secure the cam 50 to the adjacent portion 56 of a handle 57 which can index the cam 50 between a plurality of different angular positions. As can be seen in FIG. 2, the cam 50 has a centrally located recess 55 having a non-circular cross-sectional outline and serving to receive the complementary portion 56 of the handle 57 so that the cam is compelled to share all angular movements of the handle 57 about the axis of the fastener 59.

Each cylinder and piston unit 43 comprises a reciprocable piston 47 which is received in the respective cylinder 46 and is biased by a coil spring 49 so that its inner end portion 48 extends into the space 45 of the respective housing 44 and is maintained in contact with the peripheral surface of the cam 50. Thus, the pistons 47 can be said to constitute follower which continuously track the peripheral surface of the cam 50. Each piston 47 has one or more sealing rings to prevent escape of hydraulic fluid from the respective cylinder 46 in a direction toward the cam 50.

The cam 50 is rotatably mounted in bearings of the housings 44. The upper housing 44 of FIG. 4 has a circular opening for a short cylindrical portion 58 of the handle 57, and the lower housing 44 of FIG. 3 has a similar circular opening for a short cylindrical portion or abutment 53 of the cam 50. The latter further comprises a radially outwardly extending collar 54 which is adjacent the abutment 53 and overlies the underside of the lower housing 44. The handle 57 overlies the upper side of the upper housing 44 adjacent its cylindrical portion 58 within an opening in the top wall of the outer housing 67.

As can be seen in FIG. 2, one-half of the peripheral surface of the distancing member or cam 50 includes three angularly offset portions 60, 61, 62 which are disposed at different distances from the axis about which the cam 50 can be indexed by the handle 57, i.e., from the axis of the fastener 59. The other half of the peripheral surface of the cam 50 has two angularly offset portions 61', 62' which are also disposed at different distances from the axis of the fastener 59. The distance of the portion 60 from the axis of the cam 50 is less than the distance of the portion 61, and the distance of the portion 61 from such axis is less than the distance of the portion 62.

FIG. 2 shows that the handle 57 maintains the cam 50 in an angular position in which the median portion 61 of the left-hand half of the peripheral surface of the cam 50 is engaged by the end portions 48 of the two lefthand pistons 47. This corresponds to those axial positions of the respective plungers 28 in which the projections 35 at the upper sides of the gears 32 are extracted or expelled from the respective recesses or slots 37 (i.e., the respective wheel frames 23 are not directly coupled to the adjacent plungers 28). At the same time, the brakes 34 of the respective casters 10 are inoperative so that the wheels 40 of these casters can rotate about the axes of their shafts 39. Furthermore, the teeth 33 of the just discussed two casters 10 are still spaced apart from the tooth or teeth 38 of the respective brakes 34. The upper side of the outer housing 67 of the regulator 42 is provided with indicia including a character "F" which is in line with the handle 57 whenever the cam 50 assumes the angular position of FIG. 2, i.e., when the wheels 40 of at least two casters 10 are free to rotate about the axes of their respective shafts 39 and the corresponding wheel frames 23 are free to swivel about the axes of the respective carriers 11 and their cylinders 12.

If the handle 57 is moved from the position "F" to the position "R" (i.e., in a counterclockwise direction as seen in FIG. 2), the end portions 48 of the two left-hand pistons 47 of FIG. 2 are in engagement with the portion 60 of the peripheral surface of the cam 50. Thus, the springs 49 for these two pistons 47 are free to shift the pistons in a direction to the right whereby the pistons 47 draw hydraulic fluid, by way of the respective conduits 41, from the chambers 27 of the associated cylinders 12. Thus, the corresponding plungers 28 are caused or permitted to rise. The brakes 34 are installed in stressed condition so that their free end portions follow the upward movements of the respective gears 32 in response to movement of the handle 57 from the position "F" to the position "R". Thus, the brakes 34 assist or actually initiate upward movements of the respective plungers 28 to positions at levels corresponding to the level of the plunger 28 in FIG. 4. Therefore, the projections 35 of two of the plungers 28 enter the adjacent recesses or slots 37 to ensure that the respective wheel frames 23 are non-rotatably attached to the adjacent plungers 28 (i.e., to the corresponding carriers 11). Consequently, the wheels 40 of the two casters 10 are free to rotate with reference to their frames 23 but the frames 23 cannot swivel about the axes of the respective carriers 11. This is shown in FIG. 4.

If the person in charge decides to move the handle 57 in a clockwise direction from the position "F" to the position "S" of FIG. 2, the end portions 48 of the two left-hand pistons 47 come into engagement with the portion 62 of the cam 50. At such time, the two left-hand pistons 47 assume their left-hand end positions at a maximum distance from the axis of the cam 50 and the associated cylinders 12 receive metered quantities of hydraulic fluid from the cylinders 46 by way of the corresponding conduits 41. This causes the respective plungers 28 to assume their lower end positions in which the teeth 33 of their gears 32 mate with the tooth or teeth 38 of the respective brakes 34 and such brakes are maintained in frictional engagement with the adjacent wheels 40. Thus, two of the four wheel frames 23 cannot swivel relative to their carriers 11, even though the projections 35 of the corresponding plungers 28 are expelled from the adjacent recesses or slots 37, because the blocking action is then performed by the respective gears 32 and teeth 38.

If the right-hand half of the peripheral surface of the cam 50 corresponds to the left-hand half, the movements of all four pistons 47 are synchronized in such a way that the condition of each caster 10 is always the same, i.e., all four wheels 40 are free to rotate about the axes of the respective shafts 39 if one of these wheels is free to rotate, all four frames 23 are blocked by the respective projections 35 and disc-shaped blocking portions 36 if one of the blocking device sections 35–37 is operative, and all four frames 23 are blocked by the respective gears 32 and gear teeth 38 if one of the frames 23 is blocked in the just described manner. All that is necessary is to replace the illustrated cam 50 with a cam wherein the configuration of both halves of its peripheral surface is selected with a view to ensure that the axial positions of all four pistons 47 are always the same irrespective of the selected angular position of the cam 50.

However, and since the configuration of one-half of the peripheral surface of the illustrated cam 50 departs from the configuration of the other half, the movements of two of the four pistons 47 are not identical with movements of the other two pistons 47. The portions 61', 62' of the peripheral surface of the cam 50 correspond to the portions 61 and 62. Thus, the axial positions of all four pistons 47 are the same when the end portions 48 of such pistons engage the portions 61 and 61' or 62 and 62' of the peripheral surface of the cam 50. However, when the left-hand pistons 47 of FIGS. 2 and 3 engage the cam portion 60, i.e., when the lefthand pistons 47 are nearest the axis of the cam 50, the two right-hand pistons 47 are located at a greater distance from such axis. Therefore, the plungers 28 of casters 10 which are controlled by the two right-hand cylinder and piston units 43 of FIGS. 2 and 3 cannot assume conditions in which their wheels 40 are free to rotate but the respective wheel frames are blocked. This does not appreciably affect the versatility of the apparatus because it normally suffices to block two of the four wheel frames forming part of casters for the legs 75 of a hospital bed or the like.

The regulator 42 further comprises detent means for releasably holding the handle 57 and the cam 50 in any one of several selected positions. The detent means comprises a female detent portion with three notches 63 in the underside of the handle 57 adjacent the portion 56 and a male detent portion 64 in the outer housing 67 or in one of the housings 44. The male detent portion 64 can include an externally threaded receptacle for a spring-biased ball or plug which can yield in response to turning of the handle 57 to thereupon penetrate into the selected notch 63.

Each conduit 41 is connected with the respective nipple 18 (FIG. 4) and with the respective cylinder and piston unit 43 (FIG. 2). The housing 44 for the cylinders 46 have bores or channels 65 which establish paths for the flow of hydraulic fluid from the units 43 to the respective cylinders 12 or vice versa by way of the respective conduits 41. Each bore 65 can extend transversely across the entire housing 44 so that one of its halves receives the end of a conduit 41 and the other of its halves receives a screw 66 which can be loosened to permit escape of air from the respective cylinder 46.

The aforementioned coupling elements 52 of the housings 44 can further serve to facilitate attachment of the regulator 42 to any selected part of a bed or the like. All that is necessary is to temporarily remove the outer housing 67 and to use the coupling elements 51 for introduction of bolts, screws or other suitable means for fastening the stacked housings 44 to a bed frame or the like.

The improved apparatus is susceptible of many modifications without departing from the spirit of the invention. For example, the illustrated distancing member or cam 50 can be replaced with a cam which can move each of four pistons 47 between three or more different positions. Moreover, the configuration of the peripheral surface of the cam 50 can be such that the two left-hand or the two right-hand pistons 47 of FIGS. 2 and 3 assume different axial positions in certain angular positions of the cam. All this merely involves an appropriate selection of configuration of the peripheral surface of the selected cam.

It is further possible to replace the spherical antifriction rolling elements 25 and/or 26 with otherwise configurated rolling elements or to employ deep groove ball bearings or friction bearings in lieu of the illustrated antifriction ball bearings. Reference may be had to commonly owned U.S. Pat. Nos. 4,658,466 and 4,765,021 which disclose friction bearings for use in casters.

An important advantage of the improved apparatus is that the cylinders 12 of the carriers 11 can receive or can discharge accurately metered quantities of oil or another hydraulic fluid. This renders it possible to move the plungers 28 between two, three or more predetermined positions relative to the corresponding cylinders 12 and to thus greatly enhance the versatility of the apparatus. Thus, each plunger 28 can be moved between two end positions and, depending on selected configuration of the peripheral surface of the cam 50, to one or more intermediate positions. In the embodiment which is shown in the drawing, two of the plungers 28 are movable between three different axial positions including an upper end position in which the respective brakes 34 are disengaged and the respective detent devices including the parts 32-33 and 35-37 are operative (because the projections 35 are received in the respective recesses 37) so that the wheels 40 can rotate but the respective frames 23 cannot swivel relative to the corresponding carriers 11. When the plungers 28 assume their lower end positions, the brakes 34 engage the respective wheels 40 and the blocking devices are operative because the gear teeth 33 engage the adjacent tooth or teeth 38 while the projections 35 are located beneath the respective recesses 37. When the plungers 28 assume their intermediate positions, the brakes 34 are remote from the respective wheels 40 and the blocking devices are also inoperative because the projections 35 are still located beneath the adjacent recesses 37 and the gear teeth 33 are disengaged from the adjacent teeth 38.

Though it is possible to employ discrete distancing members for the pistons 47 of the cylinder and pistons units (motors) 43, the illustrated apparatus is preferred at this time due to its simplicity and compactness, i.e., a single distancing member 50 suffices to move a plurality of discrete pistons 47 to a selected number of different positions in response to indexing of the distancing member about the respective axis.

It is further possible to employ a discrete housing for each cylinder and piston unit 43. The illustrated apparatus exhibits the advantage that pairs of units 43 are properly positioned relative to each other and relative to the cam 50 as soon as such units are properly installed in the respective housings 46. The utilization of housings 46 for pairs of cylinder and piston units 43 also contributes to simplicity and compactness of the improved apparatus. The aforedescribed configuration of the handle 57 (with its cylindrical portion 58) and of the cam 50 (with its cylindrical portion 53 and collar 54) ensures automatic centering of the cam 50 in the spaces 45 of the stacked housings 44 and predictable axial movements of the pistons 47 in response to indexing of the cam.

The cam 50 which is shown in FIGS. 2 and 3 can be used with advantage to enhance the versatility of casters 10 at one end of a hospital bed or the like. Thus, the casters at one end of the bed can have their wheels 40 arrested simultaneously with blocking of the respective frames 23, their wheels can rotate while the frames are blocked, and their wheels can rotate while the respective frames are free to swivel. At the same time, the casters at the other end of the bed can merely have their wheels arrested simultaneously with blocking of the respective frames, or the wheels are free to rotate whenever the respective frames are free to swivel. As mentioned above, this does not unduly affect the maneuverability of the commodity which is mounted on the casters of the improved apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I CLAIM:

1. Supporting apparatus for mobile commodities, such as hospital beds, comprising ground-contacting means including a plurality of casters each having a wheel, a frame mounting the wheel for rotation about a first axis and a carrier having a cylinder and mounting the frame for rotation about a second axis substantially at right angles to the first axis; and means for controlling the movements of said frames and said wheels about the respective axes, comprising a discrete liquid-operated plunger reciprocably mounted in the cylinder of each carrier for movement between a plurality of positions, a discrete brake provided on each frame to engage the respective wheel in response to movement of the respective plunger to a first position, a discrete blocking device for each of said frames, each blocking device being operative to prevent rotation of the respective frame in response to movement of the respective plunger to at least one second position, and means for moving the plungers between said positions including motors having means for supplying metered quantities of liquid to said carriers, each of said motors comprising a discrete cylinder and piston unit, means for displacing the piston with reference to the cylinder of the respective unit, and discrete means for conveying liquid between the cylinders of said carriers and the cylinders of the respective units in response to displacement of pistons of said units, said displacing means comprising a common indexible displacing member for the pistons of said units, and units including a first and a second unit and said displacing member being disposed between said first and second units, at least one of said brakes being disengaged and the respective blocking device simultaneously permitting rotation of the respective frame in a third position of the respective plunger.

2. The apparatus of claim 1, further comprising a common housing for said first and second units.

3. The apparatus of claim 2, wherein said housing defines a space for said indexible displacing member and the pistons of said first and second units extend into said space, said first and second units further including means for biasing the pistons of said first and second units against said displacing member.

4. The apparatus of claim 3, wherein said units further include a third and a fourth unit, said displacing member being disposed between said third and fourth units and further comprising a second housing for said third and fourth units, said housings comprising cooperating male and female coupling elements for maintaining said housings in predetermined positions with reference to each other.

5. The apparatus of claim 4, wherein said housings are identical and are stacked on top of each other.

6. The apparatus of claim 1, wherein said displacing member has abutments for said first and second units.

7. The apparatus of claim 1, further comprising means for indexing said displacing member, said displacing member including a cam which is indexible about a predetermined axis.

8. The apparatus of claim 1, wherein each carrier further includes a casing for the respective cylinder, the cylinder of each of said carriers having a portion defining a chamber with a non-circular outline and non-rotatably but axially movably receiving a portion of the respective plunger, the cylinder of each of said carriers being non-rotatably installed in the respective casing and further comprising a flange for each of said casings and each of said flanges having a first track, each casing comprising a second track which is space apart from the respective first track and each frame having a portion disposed between the respective first and second tracks.

9. The apparatus of claim 8, further comprising anti-friction rolling elements between said portion of said frame and said tracks.

10. The apparatus of claim 1, wherein each plunger is non-rotatably installed in the cylinder of the respective carrier and includes a toothed gear within the respective frame, each brake being in engagement with and being movably by the respective gear against the respective wheel in response to movement of the plunger to said first position.

11. The apparatus of claim 10, wherein each brake includes a leaf spring having a first portion secured to the respective frame and a second portion abutting the respective gear.

12. The apparatus of claim 11, wherein each second portion of said leaf spring includes at least one tooth engageable with the teeth of the respective gear in a further position of the respective plunger.

13. The apparatus of claim 12, wherein each gear includes a toothless central portion and the respective leaf spring has a free end portion abutting the respective toothless portion.

14. The apparatus of claim 1, wherein each plunger is non-rotatably installed in the cylinder of the respective carrier and each blocking device includes a first blocking portion on the respective plunger and a second blocking portion provided on the respective frame and engaging the first blocking portion in a second position of the respective plunger.

15. The apparatus of claim 14, wherein one blocking portion of each blocking device includes at least one projection and the other blocking portion of each blocking device includes at least one recess which receives said projection in a second position of the respective plunger.

16. Supporting apparatus for mobile commodities, such as hospital beds, comprising ground-contacting means including a plurality of casters each having a wheel, a frame mounting the wheel for rotation about a first axis and a carrier having a cylinder and mounting the frame for rotation about a second axis substantially at right angles to the first axis,; means for controlling the movements of said frames and said wheels about the respective axes, comprising a discrete liquid operated plunger reciprocably mounted in the cylinder of each carrier for movement between a plurality of positions, a discrete brake provided on each frame to engage the respective wheel in response to movement of the respective plunger to a first position, a discrete blocking device for each of said frames, each blocking device being operative to prevent rotation of the respective frame in response to movement of the respective plunger to at least one second position, and means for moving the plungers between said positions including motors having means for supplying metered quantities of liquid to said carriers, each of said motors comprising a discrete cylinder and piston unit, means for displacing the piston with reference to the cylinder of the respective unit, and discrete means for conveying liquid between the cylinders of said carriers and the cylinders of the respective units in response to displacement of pistons of said units, and displacing means comprising a common indexible displacing member for the pistons of said units, said units including a first and a second unit and said displacing member being disposed between said first and second units; and means for indexing said displacing member, said displacing member including a cam which is indexible about a predetermined axis and has a centrally located recess with a non-circular cross-sectional outline, said indexing means including a handle having a portion extending into said recess.

17. Supporting apparatus for mobile commodities, such as hospital beds, comprising ground-contacting means including a plurality of casters each having a wheel, a frame mounted the wheel for rotation about a first axis and a carrier having a cylinder and mounting the frame for rotation about a second axis substantially at right angles to the first axis; means for controlling the movements of said frames and said wheels about the respective axes, comprising a discrete liquid-operated plunger reciprocably mounted in the cylinder of each carrier for movement between a plurality of positions, a discrete brake provided on each frame to engage the respective wheel in response to movement of the respective plunger to a first position, a discrete blocking device for each of said frames, each blocking device being operative to prevent rotation of the respective frame in response to movement of the respective plunger to at least one second position, and means for moving the plungers between said positions including motors having means for supplying metered quantities of liquid to said carriers, each of said motors comprising a discrete cylinder and piston unit, means for displacing the piston with reference to the cylinder of the respective unit, and discrete means for conveying liquid between the cylinders of said carriers and the cylinders of the respective units in response to displacement of pistons of said units, said displacing means comprising a common indexible displacing member for the pistons of said units, said units including a first and a second unit and said displacing member being disposed between said first and second units, said first and second units including means for biasing the respective pistons against said displacing member, said displacing member including a cam which is indexible about a predetermined axis and has a peripheral surface which is tracked by the pistons of said first and second units, said peripheral surface including three portions disposed at different distances from said predetermined axis; and means for indexing said cam between three different positions in each of which the piston of one of said first and second units engages a different portion of said peripheral surface.

18. The apparatus of claim 17, further comprising detent means for releasably holding said cam in any one of said three different positions.

19. The apparatus of claim 18 wherein said detent means includes a first portion on said indexing means and a second portion on at least one of said units.

20. The apparatus of claim 17, wherein the peripheral surface of said cam further comprises two additional portions disposed at different distances from said predetermined axis.

21. The apparatus of claim 20, wherein said peripheral surface has two halves one of which includes said three portions and the other of which includes said two additional portions.

* * * * *